US012649429B2

(12) United States Patent
Kimura et al.

(10) Patent No.: US 12,649,429 B2
(45) Date of Patent: Jun. 9, 2026

(54) OUTLET BOX

(71) Applicant: KABUSHIKI KAISHA TOYOTA JIDOSHOKKI, Aichi-ken (JP)

(72) Inventors: Atsuhito Kimura, Kariya (JP); Takashi Takeuchi, Kariya (JP); Yoshiaki Oshita, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 251 days.

(21) Appl. No.: 18/657,847

(22) Filed: May 8, 2024

(65) Prior Publication Data

US 2024/0399985 A1 Dec. 5, 2024

(30) Foreign Application Priority Data

May 30, 2023 (JP) ................................. 2023-088870

(51) Int. Cl.
*B60R 16/023* (2006.01)
*B60R 16/033* (2006.01)
*H02G 3/08* (2006.01)

(52) U.S. Cl.
CPC ........ *B60R 16/0239* (2013.01); *B60R 16/033* (2013.01); *H02G 3/081* (2013.01)

(58) Field of Classification Search
None
See application file for complete search history.

(56) References Cited

U.S. PATENT DOCUMENTS

| | | | | |
|---|---|---|---|---|
| 3,437,737 A * | 4/1969 | Wagner | .................... | H02G 3/18 |
| | | | | 174/66 |
| 6,376,770 B1 * | 4/2002 | Hyde | ..................... | H02G 3/123 |
| | | | | 33/528 |
| 6,429,371 B2 * | 8/2002 | Schiedegger | .......... | H02G 3/123 |
| | | | | 220/3.9 |
| 6,492,591 B1 * | 12/2002 | Metcalf | .................. | A47B 21/06 |
| | | | | 174/53 |
| 9,819,116 B1 * | 11/2017 | Baughman | .............. | B60R 13/07 |
| 11,142,072 B2 * | 10/2021 | Bhat | ...................... | H01R 13/74 |
| 2002/0101041 A1 * | 8/2002 | Kameyama | .......... | H01R 13/521 |
| | | | | 277/628 |

(Continued)

FOREIGN PATENT DOCUMENTS

| | | |
|---|---|---|
| JP | H09-74666 A | 3/1997 |
| JP | H11-54211 A | 2/1999 |

*Primary Examiner* — Krystal Robinson

(74) *Attorney, Agent, or Firm* — Greenblum & Bernstein, P.L.C.

(57) ABSTRACT

A back wall that defines a recess of an outlet box includes a first cover portion and a second cover portion that respectively include a first through-hole and a second through-hole. The first through-hole and the second through-hole are configured to open a first terminal insertion port of a first outlet member and a second terminal insertion port of a second outlet member in the back wall, respectively. Each of the first cover portion and the second cover portion is inclined with respect to an opening surface of the recess. The second cover portion projects toward the opening surface with respect to the first cover portion. The first cover portion and the second cover portion are arranged in that order in a direction along the opening surface and in which a depth from the opening surface to the first cover portion increases.

6 Claims, 4 Drawing Sheets

(56)        References Cited

U.S. PATENT DOCUMENTS

| 2002/0117317 | A1* | 8/2002 | Archer | H02G 3/08 |
| | | | | 174/50 |
| 2018/0083381 | A1* | 3/2018 | Mueller | H01R 13/5205 |
| 2018/0181359 | A1* | 6/2018 | Monroe | B60K 35/60 |
| 2019/0381905 | A1* | 12/2019 | Winkler | B60K 35/60 |
| 2020/0079299 | A1* | 3/2020 | Salter | B60K 25/02 |
| 2021/0025216 | A1* | 1/2021 | Salter | H02G 3/22 |
| 2021/0104851 | A1* | 4/2021 | Bhat | B60L 55/00 |
| 2022/0200292 | A1* | 6/2022 | Lautenbach | B60R 16/03 |
| 2023/0163535 | A1* | 5/2023 | Glendinning | H01R 13/713 |
| | | | | 439/490 |
| 2023/0256887 | A1* | 8/2023 | Harmon | B60R 13/01 |
| | | | | 224/404 |
| 2024/0101029 | A1* | 3/2024 | Salter | B60R 25/305 |
| 2024/0283188 | A1* | 8/2024 | Benitez | H01R 13/447 |

* cited by examiner

100

| Vehicle On-Board Battery ~130 | Inverter ~140 | Outlet Members ~11, 12 |

Up

Down

OUTLET BOX

CROSS-REFERENCE TO RELATED APPLICATIONS

This application is based upon and claims the benefit of priority from prior Japanese Patent Application No. 2023-088870, filed on May 30, 2023, the entire contents of which are incorporated herein by reference.

BACKGROUND

1. Field

The present disclosure relates to an outlet box.

2. Description of Related Art

Japanese Laid-Open Patent Publication No. H11-54211 and Japanese Laid-Open Patent Publication No. H9-74666 each disclose a vehicle power outlet provided in a vehicle. In the first publication, the vehicle power outlet is provided in the center console box of a vehicle. In the second publication, the vehicle power outlet is provided in the side trim of the rear cargo area of a vehicle. A vehicle power outlet can supply electric power of a vehicle on-board battery mounted on a vehicle.

A vehicle power outlet includes an outlet member having a terminal insertion port, into which terminals of an insertion plug is inserted. In a vehicle, a mounting surface to which a vehicle power outlet is mounted may be inclined with respect to a vertical direction of the vehicle. In such cases, it is desirable to prevent difficulties in inserting the terminals of the insertion plug into the terminal insertion port.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an outlet box of a vehicle power outlet is configured to supply electric power of a vehicle on-board battery. The outlet box includes a mounting base and a back wall. The mounting base is mounted on a mounting surface of a vehicle. The mounting base includes a first surface facing the mounting surface and a second surface opposite to the first surface. The back wall defines a recess recessed from the second surface. The back wall includes a first cover portion including a first through-hole and a second cover portion including a second through-hole. The first through-hole is configured such that a first terminal insertion port of a first outlet member configured to supply electric power of the vehicle on-board battery is opened in the back wall. The second through-hole is configured such that a second terminal insertion port of a second outlet member configured to supply electric power of the vehicle on-board battery is opened in the back wall. Each of the first cover portion and the second cover portion is inclined with respect to an opening surface of the recess. The second cover portion projects toward the opening surface with respect to the first cover portion. The first cover portion and the second cover portion are arranged in that order in a direction along the opening surface and in which a depth from the opening surface to the first cover portion increases.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An outlet box 13 according to an embodiment will be described with reference to FIGS. 1 to 5. In the following description, the terms "vertical," "left and right," and "front and back" are used to indicate the directions corresponding to the vertical, left and right, and front and back orientations of a vehicle 100, respectively.

Figure 1:
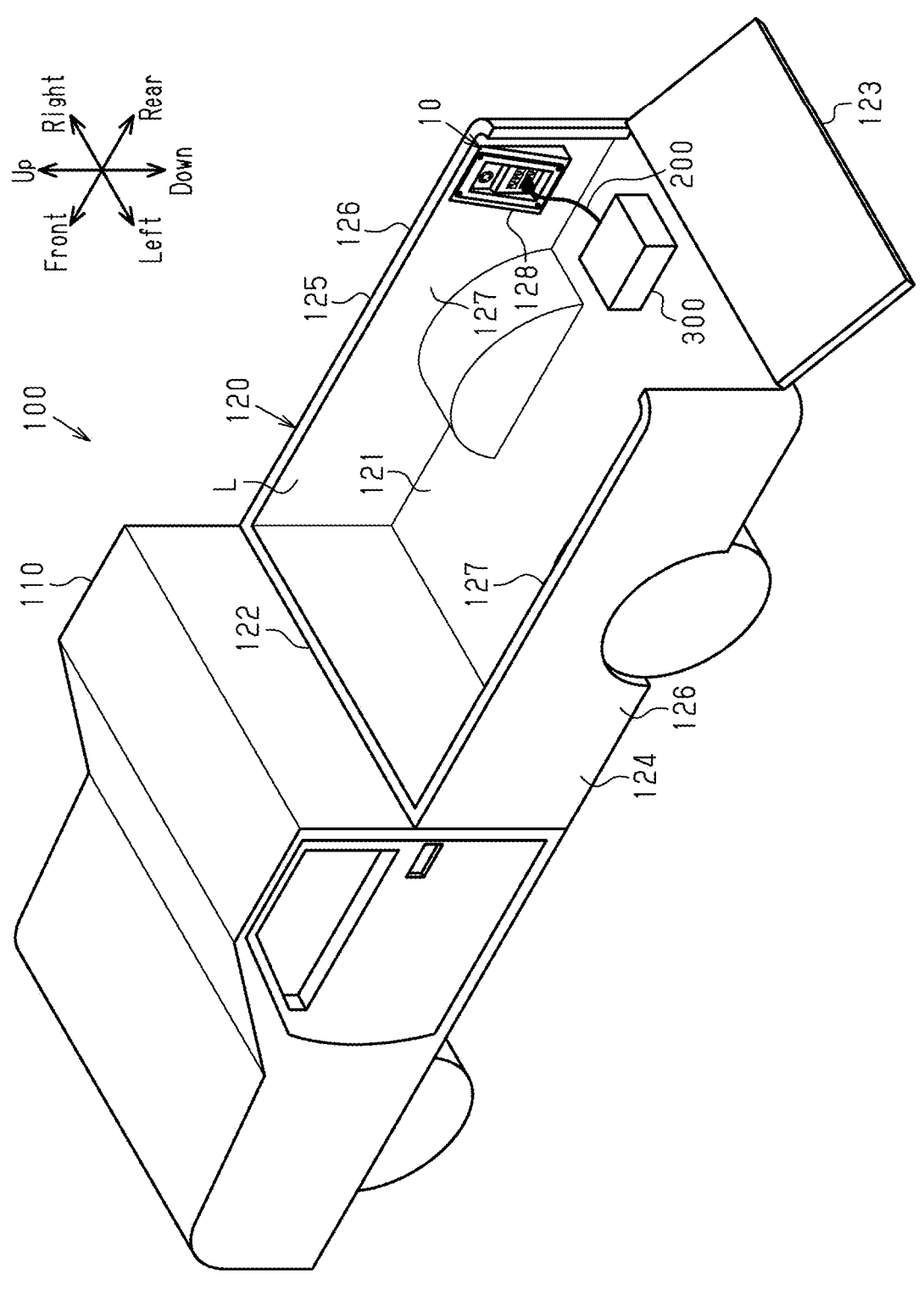
FIG. 1 is a perspective view showing a vehicle provided with a vehicle power outlet according to an embodiment.

As shown in FIG. 1, the vehicle 100 is a pickup truck having a cabin 110 located at the front of the vehicle 100 and a cargo bed 120 located at the rear of the vehicle 100. The cargo bed 120 includes a floor portion 121, a front wall portion 122, a rear wall portion 123, a left wall portion 124, and a right wall portion 125. The floor portion 121, the front wall portion 122, the rear wall portion 123, the left wall portion 124, and the right wall portion 125 define a cargo area L. The rear wall portion 123 is openable. Each of the left wall portion 124 and the right wall portion 125 includes an outer wall portion 126, which forms an outer surface of the vehicle 100, and an inner wall portion 127, which defines the cargo area L. The right wall portion 125 includes a protruding portion 128 that protrudes from the inner wall portion 127 into the cargo area L. The protruding portion 128 is located at an upper and rear section of the right wall portion 125.

Figures 2, 3:
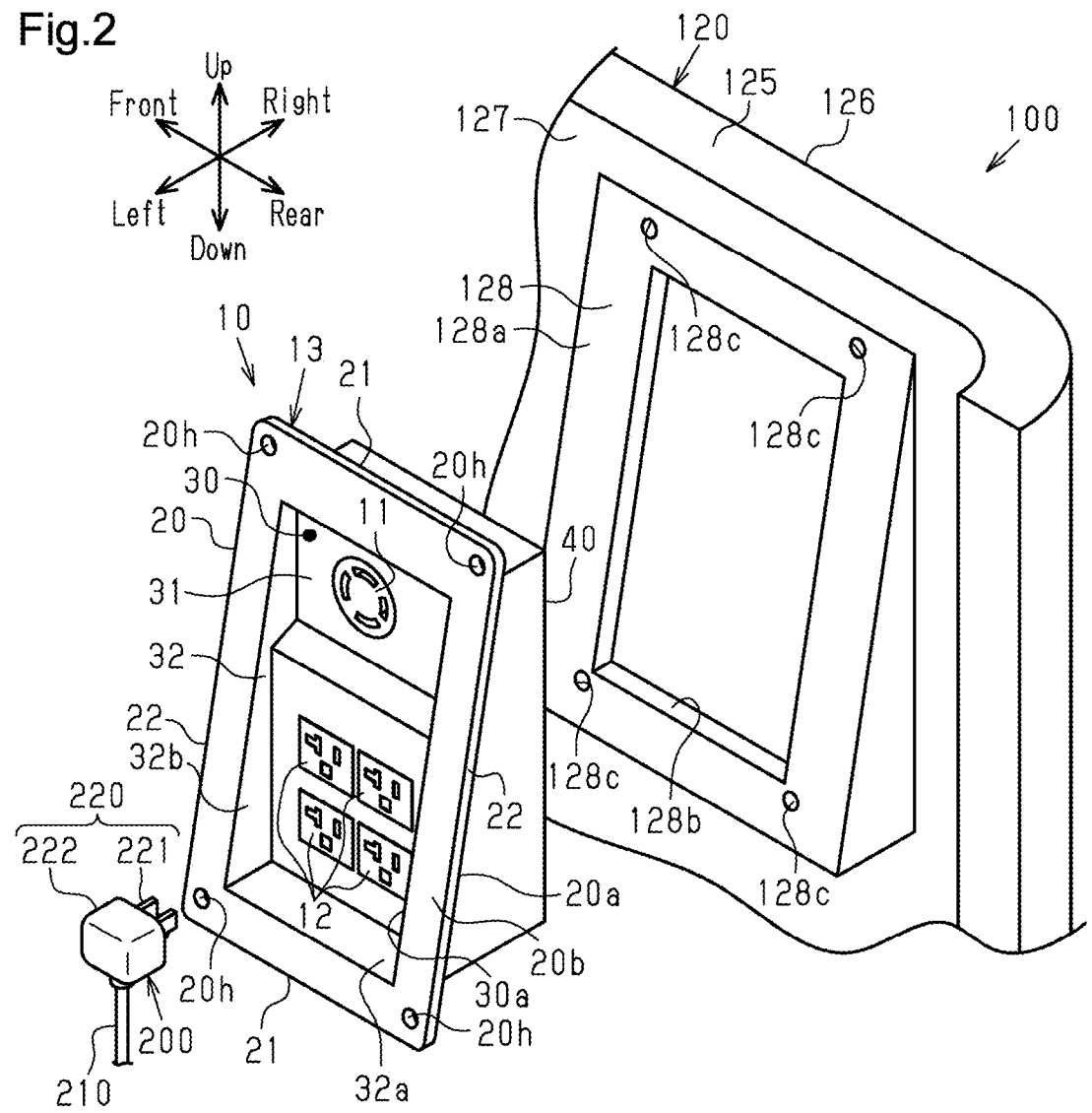
FIG. 2 is an exploded perspective view showing the vehicle, a vehicle power outlet, and a cable in the embodiment of FIG. 1.
FIG. 3 is a block diagram showing an electrical configuration of the vehicle shown in FIG. 1.

As shown in FIG. 2, the protruding portion 128 includes a mounting surface 128a, on which a vehicle power outlet 10 described later is mounted. The mounting surface 128a is inclined with respect to the vertical direction of the vehicle 100. In the present embodiment, the mounting surface 128a is inclined so as to slope away from the inner wall portion 127 from the upper side toward the lower side. In other words, the mounting surface 128a is directed obliquely upward. The mounting surface 128a of the present embodiment is a flat surface.

The protruding portion 128 includes a mounting hole 128b and four bolt insertion holes 128c. The mounting hole 128b and the four bolt insertion holes 128c each extend through the protruding portion 128. The mounting hole 128b of the present embodiment has a rectangular shape. The four bolt insertion holes 128c are located at the corresponding corners of the mounting hole 128b.

As shown in FIG. 3, the vehicle 100 includes a vehicle on-board battery 130 and an inverter 140, which converts DC power of the vehicle on-board battery 130 into AC power.

As shown in FIGS. 1 and 2, the vehicle 100 is equipped with the vehicle power outlet 10. In the present embodiment, the vehicle power outlet 10 is mounted on the mounting surface 128a of the protruding portion 128. The vehicle power outlet 10 is a supply port through which electric power of the vehicle on-board battery 130 can be supplied. For example, by electrically connecting the vehicle power outlet 10 to an electrical component 300 using a cable for 120 V, designated as cable 200, or a cable for 240 V (not shown), power from the vehicle on-board battery 130 can be supplied to the electrical component 300.

The cable 200 includes a harness 210 and an insertion plug 220 provided at one end of the harness 210. Although not illustrated, the harness 210 is formed by a conductive wire and an insulating coating portion that coats the conductive wire. The insertion plug 220 includes terminals 221 electrically connected to the conductive wire and an insulating terminal holding portion 222 for holding the terminals 221. Part of the terminals 221 extend from the terminal holding portion 222. The cable 200 shown in FIG. 2 is an L-shaped cable, in which the extending direction of the terminals 221 from the terminal holding portion 222 is orthogonal to the extending direction of the harness 210 from the insertion plug 220. The cable 200 may be an I-shaped cable, in which the extending direction of the terminals 221 from the terminal holding portion 222 is parallel with the extending direction of the harness 210 from the insertion plug 220. In FIG. 2 and other drawings, the shape of the cable 200 for 120 V is shown. Since the difference between a cable for 120 V and a cable for 240 V is not related to the essence of the present invention, the illustration and description of a cable for 240 V will be omitted.

Configuration of Vehicle Power Outlet

Figure 4:
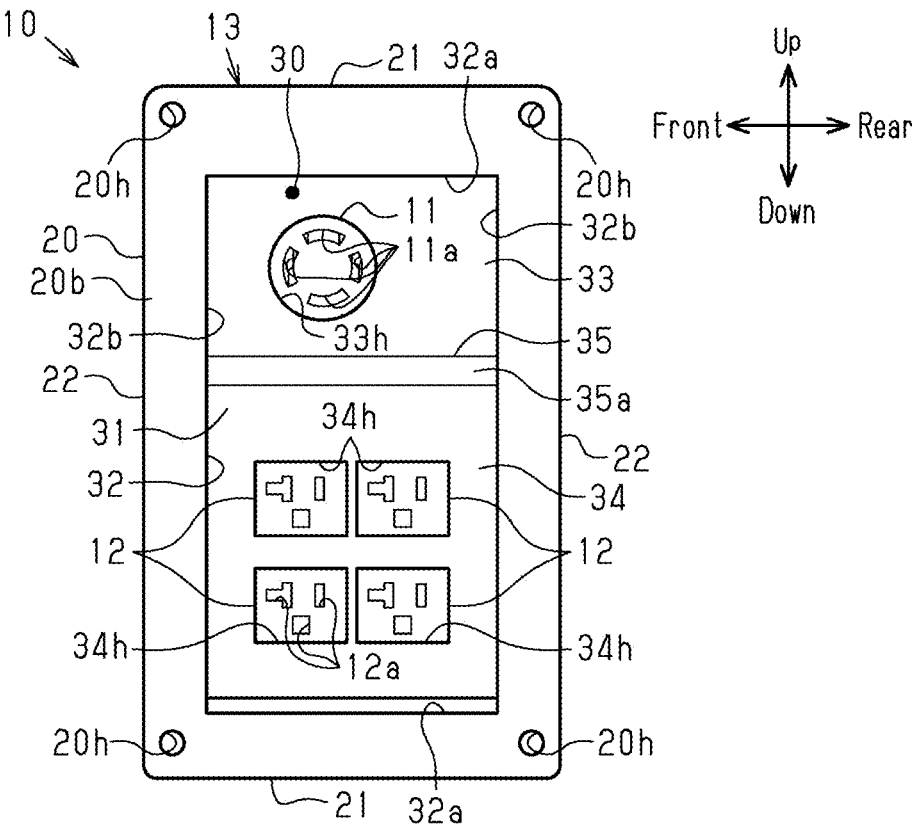
FIG. 4 is a side view of the vehicle power outlet in the embodiment of FIG. 1.

As shown in FIGS. 2 and 4, the vehicle power outlet 10 of the present embodiment includes one first outlet member 11 and four second outlet members 12. Each of the outlet members 11, 12 is capable of supplying electric power of the vehicle on-board battery 130. The output voltage of the first outlet member 11 is 240 V. The first outlet member 11 includes multiple first terminal insertion ports 11a, into which terminals of an insertion plug of a cable for 240 V (not shown) are inserted. The output voltage of each second outlet member 12 is 120 V. Each of the second outlet members 12 includes multiple second terminal insertion ports 12a, into which terminals 221 of an insertion plug 220 of the cable 200 for 120 V are inserted.

As shown in FIG. 3, each of the outlet members 11, 12 of the present embodiment is electrically connected to the output of the inverter 140. Each of the outlet members 11, 12 supplies electric power that has been converted from direct current to alternating current by the inverter 140.

As shown in FIGS. 2 and 4, the vehicle power outlet 10 includes the outlet box 13.

The outlet box 13 is provided with a mounting base 20 mounted on the mounting surface 128a. The mounting base 20 has the shape of a plate. The mounting base 20 includes a first surface 20a and a second surface 20b. Each of the first surface 20a and the second surface 20b is a surface orthogonal to a thickness direction of the mounting base 20. The second surface 20b is a surface on a side opposite to the first surface 20a. The mounting base 20 of the present embodiment has the shape of a flat plate. Therefore, each of the first surface 20a and the second surface 20b is a flat surface.

Figure 5:
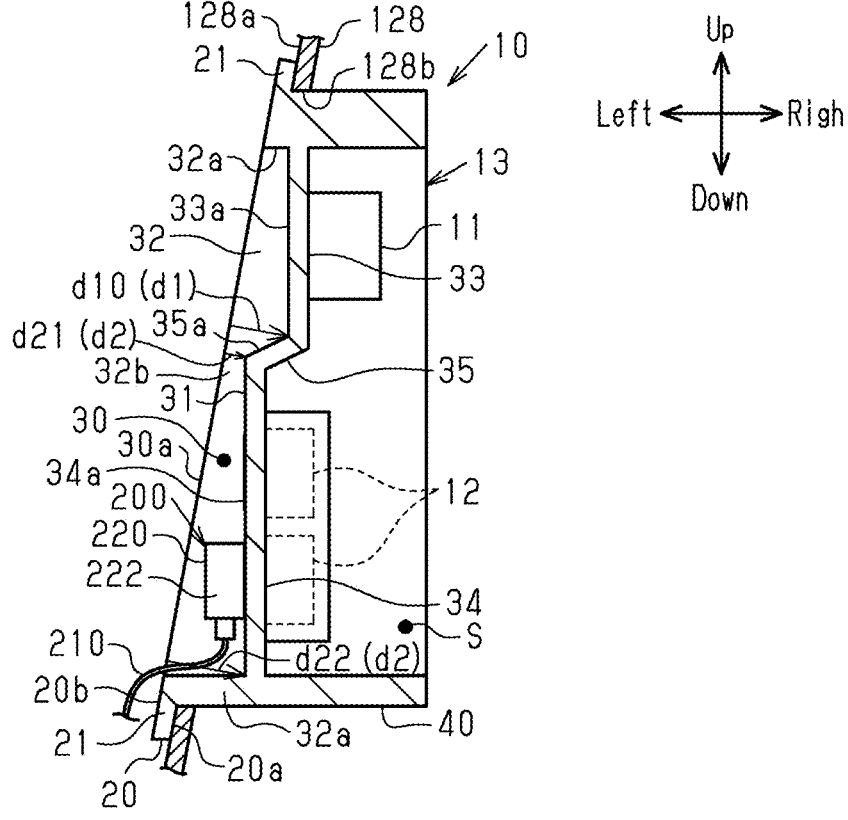
FIG. 5 is a cross-sectional view of the vehicle power outlet in the embodiment of FIG. 1.

As shown in FIGS. 2 and 5, the outlet box 13 includes a recess 30 recessed from the second surface 20b of the mounting base 20. The recess 30 includes an opening surface 30a, which opens in the second surface 20b of the mounting base 20. The opening surface 30a of the present embodiment has a rectangular shape. The opening surface 30a is an imaginary plane defined by an opening edge of the recess 30.

The recess 30 is defined by a back wall 31 and a side wall 32, which connects the back wall 31 to the mounting base 20. The back wall 31 of the present embodiment has a rectangular shape. The side wall 32 of the present embodiment has the shape of a rectangular frame. The side wall 32 include two first wall portions 32a, which face each other in the longitudinal direction of the back wall 31, and two second wall portions 32b, which face each other in the transverse direction of the back wall 31.

As shown in FIG. 4, the mounting base 20 of the present embodiment has the shape of a rectangular frame surrounding the recess 30. The mounting base 20 includes two first constituent sections 21, which are located on the opposite sides of the recess 30 in the longitudinal direction of the back wall 31, and two second constituent sections 22, which are located on the opposite sides of the recess 30 in the transverse direction of the back wall 31. A bolt insertion hole 20h is formed at each of the four corners of the mounting base 20. The bolt insertion holes 20h extend through the mounting base 20 in the thickness direction.

As shown in FIGS. 4 and 5, the back wall 31 includes a first cover portion 33, a second cover portion 34, and a stepped portion 35.

As shown in FIG. 5, the first cover portion 33 includes a first inner surface 33a, which forms a part of the inner surface of the back wall 31. The second cover portion 34 includes a second inner surface 34a, which forms a part of the inner surface of the back wall 31. Each of the first cover portion 33 and the second cover portion 34 of the present embodiment has the shape of a flat plate. Each of the first inner surface 33a and the second inner surface 34a is a flat surface.

Each of the first cover portion 33 and the second cover portion 34 is inclined with respect to the opening surface 30a of the recess 30. In the present embodiment, the first cover portion 33 and the second cover portion 34 are parallel to each other. Therefore, the inclination angle of the first cover portion 33 with respect to the opening surface 30a of the recess 30 is the same as the inclination angle of the second cover portion 34 with respect to the opening surface 30a of the recess 30. The inclination angle of each of the cover portions 33, 34 with respect to the opening surface 30a of the recess 30 is substantially the same as the inclination angle of the mounting surface 128a with respect to the vertical direction of the vehicle 100.

Since the first cover portion 33 is inclined with respect to the opening surface 30a of the recess 30, a depth d1 from the opening surface 30a to the first cover portion 33 varies depending on the location. Specifically, the depth d1 from the opening surface 30a to the first cover portion 33 increases toward the lower side of the first cover portion 33. The depth d1 from the opening surface 30a to the first cover portion 33 is a distance from the opening surface 30a to the first cover portion 33 in a direction orthogonal to the opening surface 30a. In the present embodiment, the depth d1 from the opening surface 30a to the first cover portion 33 increases from the first constituent section 21 on the upper side toward the first constituent section 21 on the lower side in the longitudinal direction of the opening surface 30a. The first cover portion 33 is inclined with respect to the opening surface such that the depth d1 from the opening surface 30a to the first cover portion 33 increases toward the second cover portion 34.

In addition, since the second cover portion 34 is inclined with respect to the opening surface 30a of the recess 30, a depth d2 from the opening surface 30a to the second cover portion 34 varies depending on the location. Specifically, the depth d2 from the opening surface 30a to the second cover portion 34 increases toward the lower side of the second cover portion 34. The depth d2 from the opening surface 30a to the second cover portion 34 is a distance from the opening surface 30a to the second cover portion 34 in a direction orthogonal to the opening surface 30a. In the present embodiment, the depth d2 from the opening surface 30a to the second cover portion 34 increases from the first constituent section 21 on the upper side toward the first constituent section 21 on the lower side in the longitudinal direction of the opening surface 30a. Therefore, the direction in which the depth d1 from the opening surface 30a to the first cover portion 33 increases agrees with the direction in which the depth d2 from the opening surface 30a to the second cover portion 34 increases. The second cover portion 34 is inclined with respect to the opening surface 30a such that the depth d2 from the opening surface 30a to the second cover portion 34 increases as the distance from the first cover portion 33 increases.

The first cover portion 33 and the second cover portion 34 are arranged in a direction along the opening surface 30a and in which the depth d1 from the opening surface 30a to the first cover portion 33 increases. The second cover portion 34 is located on a side on which the depth d1 is deeper in the direction along the opening surface 30a and in which the depth d1 from the opening surface 30a to the first cover portion 33 increases. That is, the first cover portion 33 and the second cover portion 34 are arranged in that order in the direction along the opening surface 30a and in which the depth d1 from the opening surface 30a to the first cover portion 33 increases.

The second cover portion 34 projects toward the opening surface 30a of the recess 30 with respect to the first cover portion 33. The second inner surface 34a of the second cover portion 34 projects toward the opening surface 30a of the recess 30 with respect to the first inner surface 33a of the first cover portion 33. A depth d21 at the part where the depth d2 from the opening surface 30a to the second cover portion 34 is the shallowest is shallower than a depth d10 at the part where the depth d1 from the opening surface 30a to the first cover portion 33 is the deepest. Accordingly, a depth d22 of the part where the depth d2 from the opening surface 30a to the second cover portion 34 is the deepest is shallower than that in a case in which the second cover portion 34 does not project toward the opening surface 30a with respect to the first cover portion 33.

As shown in FIG. 4, the first cover portion 33 includes one first through-hole 33h. The first through-hole 33h extends through the first cover portion 33 in the thickness direction. The first through-hole 33h of the present embodiment has a circular shape. The second cover portion 34 includes four second through-holes 34h. Each second through-hole 34h extends through the second cover portion 34 in the thickness direction. Each second through-hole 34h of the present embodiment has a rectangular shape. The four second through-holes 34h are arranged in two rows, with two holes per row, along the longitudinal direction of the back wall 31.

The stepped portion 35 is located between the first cover portion 33 and the second cover portion 34. The stepped portion 35 connects the first cover portion 33 and the second cover portion 34 to each other. In the present embodiment, an inner surface 35a of the stepped portion 35 that faces the inside of the recess 30 is inclined to slope away from the first cover portion 33 as the inner surface 35a extends from the first cover portion 33 toward the second cover portion 34. In other words, an angle formed by the first inner surface 33a of the first cover portion 33 and the inner surface 35a of the stepped portion 35 is an obtuse angle.

The first cover portion 33 includes an end portion that is connected to the stepped portion 35 and in which the depth d1 from the opening surface 30a to the first cover portion 33 is the deepest. The second cover portion 34 includes an end portion that is connected to the stepped portion 35 and in which the depth d2 from the opening surface 30a to the second cover portion 34 is the shallowest.

As shown in FIG. 5, the outlet box 13 of the present embodiment includes a tubular peripheral wall 40 extending from the back wall 31 toward the side opposite to the side wall 32. The outlet members 11, 12 are accommodated in an accommodation space S defined by the back wall 31 and the peripheral wall 40. In other words, the outlet members 11, 12 are disposed on the side of the back wall 31 opposite to the side wall 32.

As shown in FIG. 4, the first terminal insertion ports 11a of the first outlet member 11 are opened in the first cover portion 33 through the first through-hole 33h of the first cover portion 33. That is, the first terminal insertion ports 11a are opened in the back wall 31 so as to be exposed in the recess 30. The second terminal insertion port 12a of each second outlet members 12 is opened in the second cover portion 34 through the corresponding second through-hole 34h of the second cover portion 34. That is, each second terminal insertion port 12a is opened in the back wall 31 so as to be exposed in the recess 30.

Mounted State of Vehicle Power Outlet to Vehicle

The vehicle power outlet 10 is inserted into the mounting hole 128b of the protruding portion 128 from inside the cargo area L. Each of the outlet members 11, 12 and a portion of the outlet box 13 other than the mounting base 20 are disposed in the right wall portion 125. The recess 30 opens toward the cargo area L.

The first surface 20a of the mounting base 20 faces the mounting surface 128a. The second surface 20b of the mounting base 20 is exposed in the cargo area L. The mounting base 20 is inclined with respect to the vertical direction of the vehicle 100. In the present embodiment, the mounting base 20 is inclined with respect to the vertical direction of the vehicle 100 such that the second surface 20*b* faces obliquely upward.

The mounting base 20 is mounted to the mounting surface 128*a*. Specifically, bolts (not shown) are inserted into the bolt insertion holes 20*h* of the mounting base 20 and then into the bolt insertion holes 128*c* of the protruding portion 128. Subsequently, nuts (not shown) are screwed to the bolts in the right wall portion 125. The outlet box 13 is thus mounted to the mounting surface 128*a*. In the present embodiment, the two first constituent sections 21 are located at the opposite sides of the mounting hole 128*b* in the vertical direction of the vehicle 100. The two second constituent sections 22 are located at the opposite sides of the mounting hole 128*b* in the front-rear direction of the vehicle 100.

In a state in which the outlet box 13 is mounted to the mounting surface 128*a*, the back wall 31, which defines the recess 30, is located at a position recessed from the mounting surface 128*a*. The first terminal insertion ports 11*a* and the second terminal insertion ports 12*a* are provided in the back wall 31. Therefore, in a state in which the outlet box 13 is mounted to the mounting surface 128*a*, the first terminal insertion ports 11*a* and the second terminal insertion ports 12*a* are each located at a position recessed from the mounting surface 128*a*.

The first cover portion 33 is inclined with respect to the opening surface 30*a* of the recess 30. In a state in which the outlet box 13 is mounted to the mounting surface 128*a*, the depth d1 from the opening surface 30*a* to the first cover portion 33 increases from the upper side toward the lower side. In addition, the second cover portion 34 is inclined with respect to the opening surface 30*a* of the recess 30. In a state in which the outlet box 13 is mounted to the mounting surface 128*a*, the depth d2 from the opening surface 30*a* to the second cover portion 34 increases from the upper side toward the lower side. The first cover portion 33 and the second cover portion 34 are each disposed to extend in the vertical direction of the vehicle 100. The longitudinal direction of the back wall 31 agrees with the vertical direction of the vehicle 100. The transverse direction of the back wall 31 agrees with the front-rear direction of the vehicle 100. Therefore, the first terminal insertion ports 11*a* and the second terminal insertion ports 12*a* are opened horizontally.

The first cover portion 33 and the second cover portion 34 are arranged in that order in the direction along the opening surface 30*a* and in which the depth d1 from the opening surface 30*a* to the first cover portion 33 increases. Therefore, in a state in which the outlet box 13 is mounted to the mounting surface 128*a*, the first cover portion 33 is located above the second cover portion 34. Accordingly, the first terminal insertion ports 11*a* are located above the second terminal insertion ports 12*a*.

The terminals of the insertion plug of a cable for 240 V (not shown) are inserted into the first terminal insertion ports 11*a* of the first outlet member 11 positioned in the first cover portion 33 through the recess 30. The terminals 221 of the insertion plug 220 of the cable 200 for 120 V are inserted into the second terminal insertion port 12*a* of one of the second outlet members 12 positioned in the second cover portion 34 through the recess 30.

Operation and Advantages of Present Embodiment

Operation and advantages of the present embodiment will now be described.

(1) The second cover portion 34 projects toward the opening surface 30*a* of the recess 30 with respect to the first cover portion 33. Thus, as compared to a case in which the second cover portion 34 does not project toward the opening surface 30*a* with respect to the first cover portion 33 and the second cover portion 34 is provided on the same plane as the first cover portion 33, the distance from the opening surface 30*a* of the recess 30 to the second cover portion 34 is reduced. This allows the terminals 221 of the insertion plug 220 to be readily inserted into the second terminal insertion ports 12*a* of one of the second outlet members 12.

(2) The vehicle power outlet 10 is provided on the cargo bed 120 of the vehicle 100. In other words, the vehicle power outlet 10 is provided at a place where it may be exposed to rainwater. The outlet box 13 is mounted to a mounting surface 128*a*, which is inclined with respect to the vertical direction of the vehicle 100 so as to face obliquely upward.

For example, in a case in which the cover portions 33, 34 are not inclined with respect to the opening surface 30*a* of the recess 30, that is, the cover portions 33, 34 are parallel to the opening surface 30*a* of the recess 30, the cover portions 33, 34 are inclined with respect to the vertical direction of the vehicle 100 in a state in which the outlet box 13 is mounted to the mounting surface 128*a*. Specifically, the cover portions 33, 34 are inclined so that the inner surfaces 33*a*, 34*a* face obliquely upward. Accordingly, the respective terminal insertion ports 11*a*, 12*a* of the respective outlet members 11, 12 face obliquely upward.

In this case, it is difficult to insert the terminals 221 of the insertion plug 220 into the respective terminal insertion ports 11*a*, 12*a*. Also, there is a higher possibility rainwater reaching the respective terminal insertion ports 11*a*, 12*a*. Furthermore, the harness 210 is often routed downward from the vehicle power outlet 10. However, if the cable 200 is I-shaped, the harness 210 extends obliquely upward from the vehicle power outlet 10, and thus it is difficult to route the harness 210.

In contrast, in the present embodiment, the cover portions 33, 34 are inclined with respect to the opening surface 30*a* of the recess 30. Therefore, even if the mounting surface 128*a* is inclined with respect to the vertical direction of the vehicle 100, the cover portions 33, 34 are disposed to extend in the vertical direction of the vehicle 100. In this case, the terminal insertion ports 11*a*, 12*a* of the outlet members 11, 12 are opened horizontally. This allows the terminals 221 of the insertion plug 220 to be horizontally inserted into the respective terminal insertion ports 11*a*, 12*a*. In addition, rainwater is less likely to reach the terminal insertion ports 11*a*, 12*a*. Further, the harness 210 can be easily routed.

(3) The through-holes 33*h*, 34*h* of the outlet box 13 are provided in the back wall 31, which defines the recess 30. Thus, in a state in which the outlet box 13 is mounted to the mounting surface 128*a*, the terminal insertion ports 11*a*, 12*a* are provided at positions recessed from the mounting surface 128*a*. Therefore, for example, as compared to a case in which the terminal insertion ports 11*a*, 12*a* are provided in the mounting surface 128*a*, articles in the cargo area L are unlikely to interfere with the insertion plug 220 inserted into the terminal insertion ports 11*a*, 12*a*.

(4) FIG. 5 shows a state in which the insertion plug 220 of the L-shaped cable 200 is inserted into one of the second terminal insertion ports 12*a* located on the lower side among the four second terminal insertion ports 12*a*. For example, if the second cover portion 34 does not project toward the opening surface 30*a* with respect to the first cover portion 33 and the second cover portion 34 is provided on the same plane as the first cover portion 33, the harness 210 is likely to interfere with the side wall 32. The harness 210 is routed so as to be bent at an angle close to 90 degrees from the insertion plug 220. In contrast, in the present embodiment, since the second cover portion 34 projects toward the opening surface 30*a* of the recess 30 with respect to the first cover portion 33, the distance from the opening surface 30*a* to the second cover portion 34 is relatively short. Thus, the harness 210 is unlikely to interfere with the side wall 32. Further, the bending angle of the harness 210 with respect to the insertion plug 220 is reduced.

(5) The back wall 31 includes the stepped portion 35, which is located between the first cover portion 33 and the second cover portion 34. The inner surface 35*a* of the stepped portion 35, which faces the inside of the recess 30, is inclined to slope away from the first cover portion 33 as the inner surface 35*a* extends from the first cover portion 33 toward the second cover portion 34. Therefore, in a case in which the outlet box 13 is mounted in the vehicle 100 such that the first cover portion 33 is located above the second cover portion 34, rainwater that has reached the stepped portion 35 is likely to flow down along the inner surface 35*a* of the stepped portion 35. Therefore, rainwater is unlikely to collect in the stepped portion 35.

Modifications

The above-described embodiment may be modified as follows. The above-described embodiment and the following modifications can be combined as long as the combined modifications remain technically consistent with each other.

The inner surface 35*a* of the stepped portion 35 does not necessarily need to be inclined to slope away from the first cover portion 33 as the inner surface 35*a* extends from the first cover portion 33 toward the second cover portion 34. The inner surface 35*a* of the stepped portion 35 may be, for example, orthogonal to the first cover portion 33.

The outlet box 13 of the above-described embodiment includes the two cover portions, i.e., the first cover portion 33 and the second cover portion 34, but is not limited thereto. The outlet box 13 may include three or more cover portions.

For example, the outlet box 13 may include a third cover portion provided with a third through-hole. The third through-hole is configured such that third terminal insertion ports of a third outlet member capable of supplying electric power of the vehicle on-board battery 130 is opened in the back wall 31. Similarly to the first cover portion 33 and the second cover portion 34, the third cover portion is also inclined with respect to the opening surface 30*a* of the recess 30. The third cover portion projects toward the opening surface 30*a* of the recess 30 with respect to the second cover portion 34. The first cover portion 33, the second cover portion 34, and the third cover portion are arranged in that order in the direction along the opening surface 30*a* and in which the depth d1 from the opening surface 30*a* to the first cover portion 33 increases. In other words, the first cover portion 33, the second cover portion 34, and the third cover portion are arranged in a stepped manner.

In this case, the outlet box 13 includes a second stepped portion located between the second cover portion 34 and the third cover portion, in addition to the stepped portion 35 located between the first cover portion 33 and the second cover portion 34. Similarly to the inner surface 35*a* of the stepped portion 35, the inner surface of the second stepped portion that faces the inside of the recess 30 may be inclined with respect to the vertical direction of the vehicle 100. The inclination angle of the inner surface of the second stepped portion may be the same as or different from the inclination angle of the inner surface 35*a* of the stepped portion 35.

The inclination angle of the first cover portion 33 with respect to the opening surface 30*a* of the recess 30 may be different from the inclination angle of the second cover portion 34 with respect to the opening surface 30*a* of the recess 30. In other words, the first cover portion 33 and the second cover portion 34 do not necessarily need to be parallel to each other.

Figure 6:
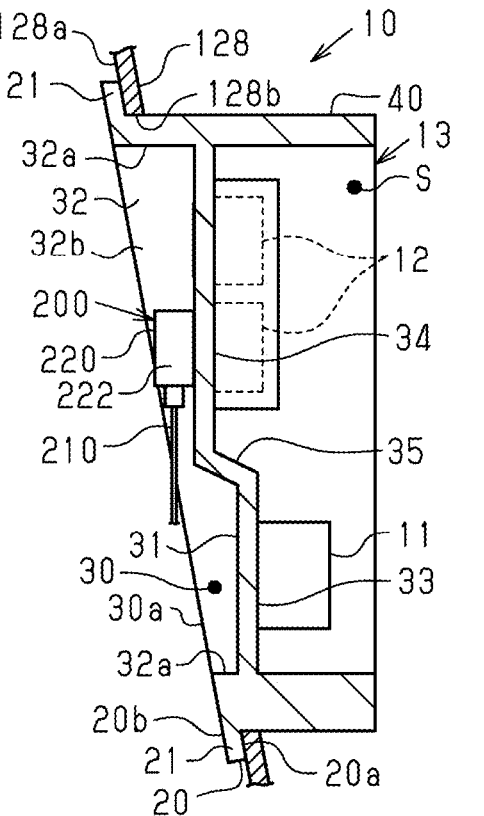
FIG. 6 is a cross-sectional view of a vehicle power outlet according to a modification.

As shown in FIG. 6, the mounting surface 128*a* may be inclined with respect to the vertical direction of the vehicle 100 so as to face obliquely downward. In this case, the outlet box 13 is mounted to the vehicle 100 such that the first cover portion 33 is positioned on the lower side and the second cover portion 34 is positioned on the upper side.

For example, in a case in which the cover portions 33, 34 are not inclined with respect to the opening surface 30*a* of the recess 30, the cover portions 33, 34 are inclined with respect to the vertical direction of the vehicle 100 in a state in which the outlet box 13 is mounted to the mounting surface 128*a*. Specifically, the cover portions 33, 34 are inclined so that the inner surfaces 33*a*, 34*a* face obliquely downward. Accordingly, the respective terminal insertion ports 11*a*, 12*a* of the respective outlet members 11, 12 face obliquely downward. In this case, it is difficult to insert the terminals 221 of the insertion plug 220 into the respective terminal insertion ports 11*a*, 12*a*. In addition, the terminals 221 are easily dislodged due to their own weight.

In contrast, in the present embodiment, the cover portions 33, 34 are inclined with respect to the opening surface 30*a* of the recess 30. Therefore, even if the mounting surface 128*a* is inclined with respect to the vertical direction of the vehicle 100, the cover portions 33, 34 are disposed to extend in the vertical direction of the vehicle 100. In this case, the terminal insertion ports 11*a*, 12*a* of the outlet members 11, 12 are opened horizontally. This allows the terminals 221 of the insertion plug 220 to be horizontally inserted into the respective terminal insertion ports 11*a*, 12*a*. In addition, the terminals 221 are unlikely to be dislodged.

Further, for example, if the second cover portion 34 is provided on the same plane as the first cover portion 33, the harness 210 of the cable 200 connected to the second outlet member 12 is likely to interfere with the cable connected to the first outlet member 11. In contrast, in the present embodiment, the second cover portion 34 projects toward the opening surface 30*a* of the recess 30 with respect to the first cover portion 33. Therefore, the harness 210 of the cable 200 connected to the second outlet member 12 is unlikely to interfere with the cable connected to the first outlet member 11.

The number of the first outlet members 11 and the number of the second outlet members 12 included in the vehicle power outlet 10 may be changed.

The output voltage of the first outlet member 11 is not limited to 240 V. The output voltage of each second outlet member 12 is not limited to 120 V. The output voltage of each of the outlet members 11, 12 may be set freely.

The power supplied by the respective outlet members 11, 12 may be DC power.

The mounting base 20 does not necessarily need to include the two first constituent sections 21. In other words, the mounting base 20 may include only the two second constituent sections 22.

The mounting base 20 does not necessarily need to include the two second constituent sections 22. In other words, the mounting base 20 may include only the two first constituent sections 21.

The mounting base 20 does not necessarily need to have the shape of a flat plate. For example, if the mounting surface 128a is a curved surface, the first surface 20a of the mounting base 20 may be curved along the mounting surface 128a.

The side wall 32, which defines the recess 30, does not necessarily need to include the first wall portion 32a adjacent to the first cover portion 33, among the two first wall portions 32a. In other words, the side wall 32 may have a U-shape having a first wall portion 32a adjacent to the second cover portion 34 and two second wall portions 32b. In this case, of the two edge portions extending in the transverse direction of the back wall 31, the edge portion adjacent to the first cover portion 33 is connected to the mounting base 20 without the side wall 32 interposed therebetween.

The outlet box 13 does not necessarily need to include the peripheral wall 40.

The outlet box 13 may include a first through-hole cover member that covers the first through-hole 33h. In this case, when the first terminal insertion ports 11a are not used, the first through-hole 33h is covered with the first through-hole cover member, so that rainwater is unlikely to reach the first terminal insertion ports 11a.

Likewise, the outlet box 13 may include a second through-hole cover member that covers the second through-hole 34h. In this case, when the second terminal insertion ports 12a are not used, the second through-hole 34h is covered with the second through-hole cover member, so that rainwater is unlikely to reach the second terminal insertion ports 12a.

The vehicle power outlet 10 may be provided on the front wall portion 122, the rear wall portion 123, or the left wall portion 124 of the cargo bed 120.

The vehicle power outlet 10 may be provided in the cabin 110.

The vehicle power outlet 10 may be provided in a vehicle 100 other than a pickup truck.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An outlet box of a vehicle power outlet configured to supply electric power of a vehicle on-board battery, the outlet box comprising:

a mounting base to be mounted on a mounting surface of a vehicle, the mounting base including a first surface facing the mounting surface and a second surface opposite to the first surface; and a back wall defining a recess recessed from the second surface, wherein the back wall includes:

a first cover portion including a first through-hole; and a second cover portion including a second through-hole, the first through-hole is configured such that a first terminal insertion port of a first outlet member configured to supply electric power of the vehicle on-board battery is opened in the back wall, and the second through-hole is configured such that a second terminal insertion port of a second outlet member configured to supply electric power of the vehicle on-board battery is opened in the back wall, each of the first cover portion and the second cover portion is inclined with respect to an opening surface of the recess, the second cover portion projects toward the opening surface with respect to the first cover portion, and the first cover portion and the second cover portion are arranged in that order in a direction along the opening surface and in which a depth from the opening surface to the first cover portion increases.

2. The outlet box according to claim 1, wherein the back wall includes a stepped portion located between the first cover portion and the second cover portion, and an inner surface of the stepped portion that faces an inside of the recess is inclined with respect to the first cover portion so as to slope away from the first cover portion as the inner surface extends from the first cover portion toward the second cover portion.

3. The outlet box according to claim 1, wherein the back wall includes a stepped portion located between the first cover portion and the second cover portion, and an inner surface of the stepped portion that faces an inside of the recess is inclined at an obtuse angle with respect to an inner surface of the first cover portion that faces the inside of the recess.

4. The outlet box according to claim 1, wherein the back wall includes a stepped portion located between the first cover portion and the second cover portion, and the first cover portion includes an end portion that is connected to the stepped portion and at which the depth from the opening surface to the first cover portion is the deepest, and the second cover portion includes an end portion that is connected to the stepped portion and at which a depth from the opening surface to the second cover portion is the shallowest.

5. The outlet box according to claim 1, wherein the first cover portion is inclined with respect to the opening surface such that the depth from the opening surface to the first cover portion increases toward the second cover portion, and the second cover portion is inclined with respect to the opening surface such that a depth from the opening surface to the second cover portion increases as a distance from the first cover portion increases.

6. The outlet box according to claim 1, wherein the first cover portion and the second cover portion are parallel.

* * * * *